(No Model.) 6 Sheets—Sheet 2.
W. H. PRINZ.
MALT TURNING MACHINE.

No. 579,771. Patented Mar. 30, 1897.

Witnesses:
W. C. Coolies
Jno. A. Christianson

Inventor:
William H. Prinz
By Henry Cobb Kennedy
Atty (No Model.) 6 Sheets—Sheet 3.

W. H. PRINZ.
MALT TURNING MACHINE.

No. 579,771. Patented Mar. 30, 1897.

Fig. 4.

Witnesses:
W. C. Coches
Jno. A. Christianson.

Inventor:
William H. Prinz
By Harry Cobb Kennedy.
Atty

(No Model.) 6 Sheets—Sheet 4.

W. H. PRINZ.
MALT TURNING MACHINE.

No. 579,771. Patented Mar. 30, 1897.

Fig. 6.

UNITED STATES PATENT OFFICE.

WILLIAM H. PRINZ, OF CHICAGO, ILLINOIS.

MALT-TURNING MACHINE.

SPECIFICATION forming part of Letters Patent No. 579,771, dated March 30, 1897.

Application filed August 19, 1895. Serial No. 559,866. (No model.)

*To all whom it may concern:*

Be it known that I, WILLIAM H. PRINZ, a citizen of the United States, residing at Chicago, in the county of Cook and State of Illinois, have invented certain new and useful Improvements in Malt-Turning Machines; and I do hereby declare the following to be a full, clear, and exact description of the invention, such as will enable others skilled in the art to which it appertains to make and use the same.

This invention relates to a novel construction in a malt-turning machine adapted for use in connection with the pneumatic system of malting, embodying a plurality of compartments in which the malt is germinated; and the object of this invention is to provide, in connection with a malt-house having a plurality of these compartments, a malt-turning machine that can be employed for turning the grain in all of the compartments.

A further object of the invention is to provide a machine that can be driven through the malt from the front to the rear end of the compartment, lifted out of the malt, returned to the front end of the compartment, transferred to the next compartment to be operated upon, and so on.

The invention consists in the features of construction and combinations of parts hereinafter fully described and specifically claimed.

Referring now to the accompanying drawings, illustrating my invention.

Figure 1:
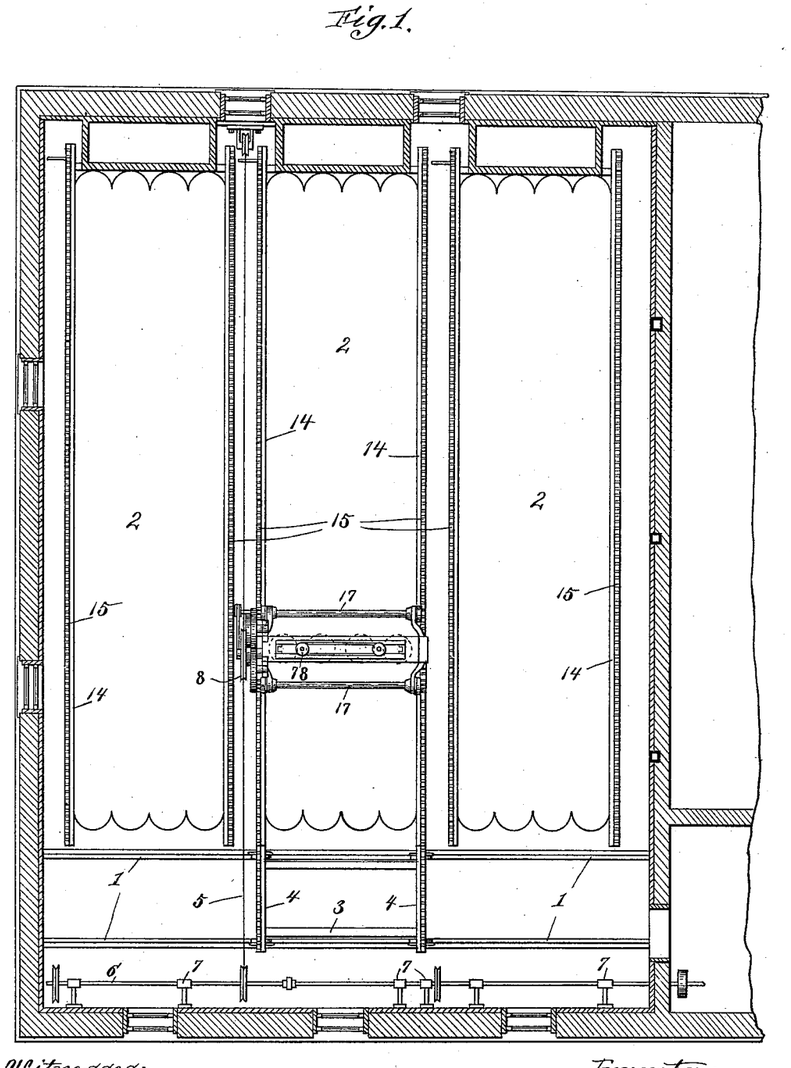
Figure 1 is a top plan view of the germinating-room of a malt-house constructed in accordance with my invention.

As before stated, it is the object of this invention to provide a machine that can be moved from one compartment to another in a malt-house, and in accordance, therefore, with the principle involved by my invention, I provide a track 1, running transversely to the malting-compartments 2 of a malt-house. This track 1 is adjacent to the forward ends of the compartments, and mounted thereupon is a truck 3 of any approved construction, that can be moved back and forth and which carries the rails 4, that are adapted to act as continuations of the compartment-rails, so that the malt-turning machine can run thereon from the compartment-rails when the machine is to be transferred. In Fig. 1 said machine is shown in position over the compartment, with the truck 3 at the end of the compartment ready to receive the same, and in Fig. 2 the machine is shown as mounted upon the truck in a position to be transferred to another compartment or to be run over the compartment in front of which it is standing.

The power to move the carriage forward and backward, to lift and depress the malt-turning screws, and to turn such screws when they are in the malt is obtained from a cable 5, one of which is situated next to each compartment and which are driven from a shaft 6, suitably mounted in bearings 7 at the end of the compartment-room, and which shaft is turned from some suitable source of power. This cable or rope 5 is trained around a sheave 8 and idler 9, Fig. 4, which sheave supplies the motive power to the malt-turning machine.

Figure 4:
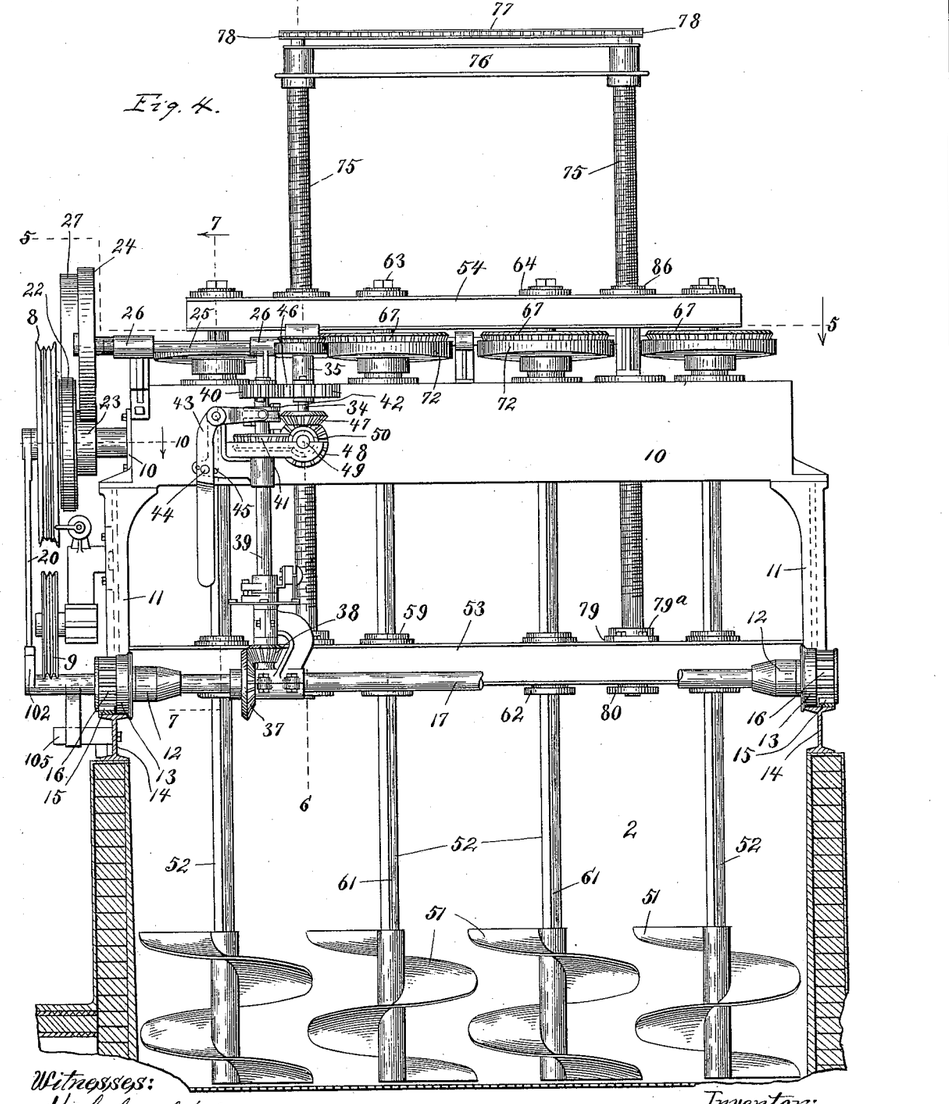
Fig. 4 is an end elevation, on an enlarged scale, of the malt-turning machine situated within a compartment and showing the compartment in vertical transverse section.

The malt-turning machine is carried by a frame consisting of the box 10, Fig. 4, and the upright side standards 11, firmly secured together. These standards 11 are provided at their lower ends with feet 12, in which are mounted the wheels 13, upon which the carriage moves, said wheels running on the rails 14 on the walls of the compartments. The said rails 14 of the compartment carry the racks 15, and two of the wheels 13 at the forward end of the machine carry pinions 16, rigidly mounted upon the shaft 17, which is driven from the sheave 8. The said carriage composed of the box 10, uprights 11, and wheels 13 supports all the parts of the malt-turning machine and can be moved back and forth by power applied to shaft 17 to turn it in opposite directions, and I have arranged mechanism whereby the carriage can be moved forward or through the malt at a slower rate of speed than when it is run back over the malt to the front end of the compartment. Said parts are constructed in the following manner:

The sheave 8 is mounted upon a sleeve 18 and turns thereon. This sleeve 18 is mounted eccentrically upon a rock-shaft 19, Fig. 10, which is securely fastened to the box 10 and can be turned by means of a lever 20, Fig. 4, fastened to the outer end of said sleeve 18. The hub 21 of the sheave extends inwardly and carries two gear-wheels rigid therewith and with each other, consisting, preferably, of the friction-rollers 22 and 23, Figs. 4 and 10, the latter being smaller than the former. These friction-gears 22 and 23 are adapted to be thrown in contact with other friction-gears carried by the machine. For instance, the small gear 23 is adapted to engage a friction-gear 24, Figs. 6 and 7, carried by a shaft 25, mounted in the bearings 26, extending from the box 10, while the gear 22 engages a friction-gear 27, carried by a shaft 28, Fig. 5, mounted in bearings 29, extending from said box. The said parts are so arranged with relation to each other that when the gear 23 engages the gear 24 the gears 22 and 27 are disengaged, and vice versa, and this engagement of these parts is controlled by the lever 20. For instance, when the lever is thrown to the position shown in Fig. 6 the gears 22 and 27 are in contact, and when thrown to the position shown in Fig. 7 the gears 23 and 24 are in contact. The shaft 28 carries also a friction-gear 30, Fig. 5, which is of the same size as the gear 24 and is in contact therewith all the time, so that no matter which of the gears 22, 23, 24, or 27 are in contact both the shafts 25 and 28 will be driven. To hold the gears 24 and 30 in frictional contact with each other, the shaft 25 is carried by an eccentric sleeve 31, to which a weight 32 is attached and which then at all times will hold the two gears in contact.

I will now proceed to describe the mechanism for moving the machine back and forth over the compartment.

Figures 5, 14, 15:
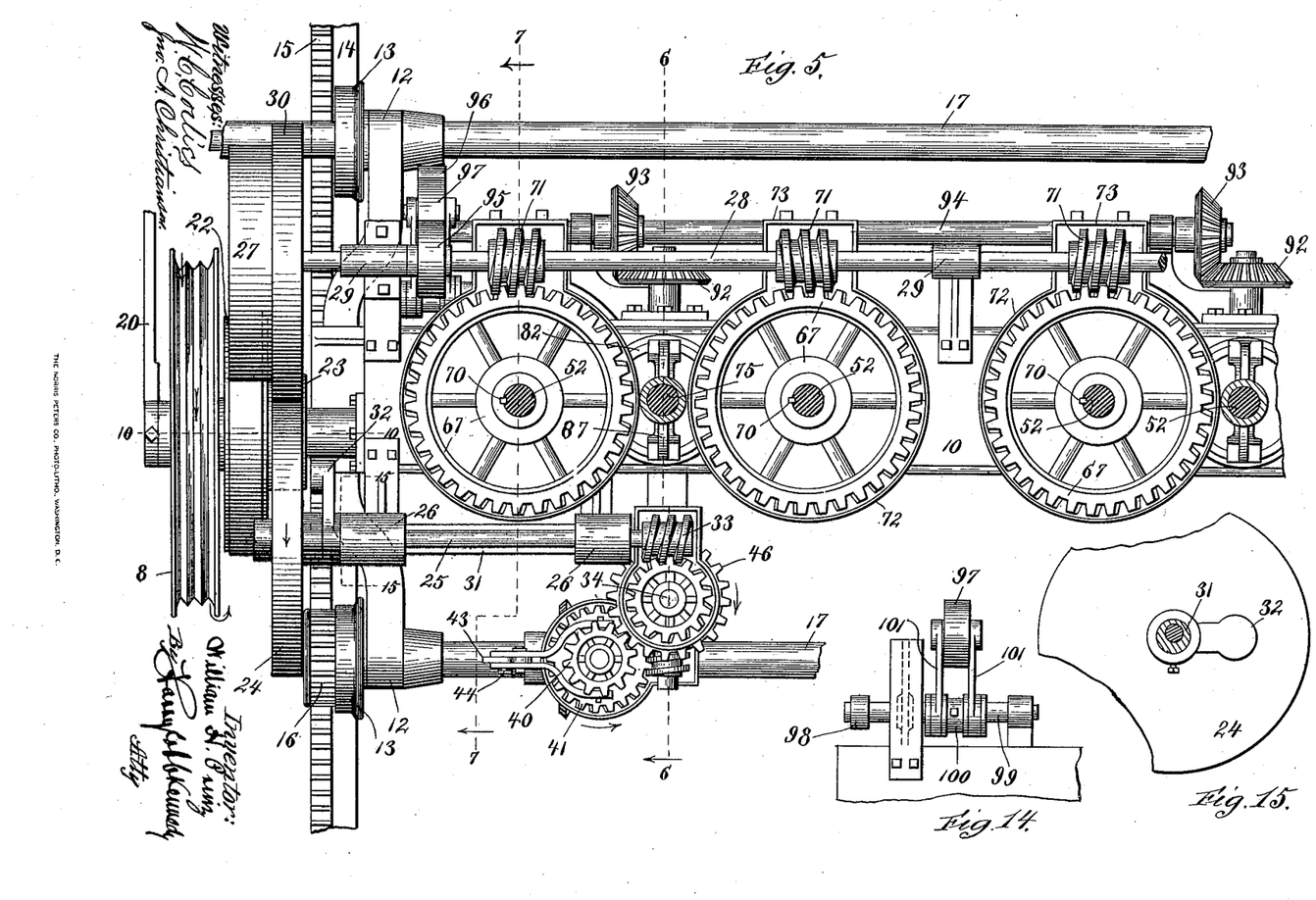
Fig. 5 is a top plan view, on a still larger scale, of a portion of the malt-turning machine, and which would be a top view of Figs. 6 and 7.
Figs. 14 and 15 are detail views.

The shaft 25 carries at its end a worm 33, Fig. 5, and this worm intermeshes with a worm-wheel keyed to the upper end of the shaft 34, mounted in bearings 35 and 36, fastened to the said box 10, the shaft 17 carrying the pinions 16, provided with a bevel-gear 37, which intermeshes with a bevel-gear 38 at the lower end of the upright shaft 39. This shaft 39 carries at its upper end a gear-wheel 40 and below this gear-wheel a worm-wheel 41. The said wheels 40 and 41 are loosely mounted on the shaft 39 and are provided with clutch members on their adjacent faces, while mounted upon the shaft between these two wheels and incapable of revolution thereon is the clutch 42. This clutch is controlled by a lever 43, as shown in Fig. 4, and can be held in engagement with either of the wheels 40 or 41 or out of engagement with both, as found convenient, and can be secured in any of these positions by a thumb-screw 44, taken into the openings 45 of the plate. The said shaft 34 carries a gear-wheel 46, intermeshing with gear-wheel 40, while at the lower end of the shaft 34 is a bevel-gear 47, intermeshing with a bevel-gear 48, carried by a horizontal shaft 49, mounted in said bearing 36, and the said shaft 49 carries at its end a worm 50, which intermeshes with the worm-wheel 41.

It will be seen from the foregoing description that the power from the shaft 25 is communicated to the driving mechanism of the carriage through the mechanism above described and that the speed of the carriage will be fast or slow according to the train of gearing set in motion. For instance, when the turning-screws are in the malt it is necessary that they should be advanced through the malt very slowly, and therefore in such case a clutch 42 is thrown in contact with the worm-wheel 41. This arrangement permits the gear 46 to turn the gear 40 upon the shaft 39, while through the intermediacy of the bevel-gears 47 and 48, worm 50, and worm-wheel 41 the shaft 39 is turned slowly to move the machine toward the rear end of the compartment.

The malt-turning machine consists of a plurality of malt-turning screws 51, that are carried by a plurality of upright spindles 52. These spindles 52 are supported by and passed through two transverse frames 53 and 54. The lower frame 53 acts more as a guide and brace or supporting-frame for the spindles 52, and consists of two channel-beams connected at their ends by a guide 55, Fig. 8, which runs in a guide-groove 55$^a$ in the side uprights 11 of the carriage. The spindles can move up and down through this supporting-frame 53, and the said supporting-frame 53 can also move up and down in the guide-grooves, and since the spindles descend into the malt and must turn within the supporting-frame I have arranged a bearing therefor which will prevent the lubricant from reaching the periphery of the spindle and therefore coming in contact with the malt. For this purpose I mount between the channel-beams of the supporting-frame 53 a bearing-sleeve 56. (Shown in Fig. 7.) This bearing-sleeve 56 rests upon the upper faces of the said beams and is provided with an upwardly-projecting flange 57. A collar 58, provided at its upper end with a flange 59, is situated within the bearing 57 and is provided interiorly with a key 60, that enters a groove 61 in the spindle. To the lower end of the collar 58 is secured an annular channel 62, the upper end of the piece forming the same abutting against the lower end of the bearing 58. In this way it will be seen that while the spindle 52 can pass longitudinally through the collar 58, yet the key-and-groove connection between said parts will cause the collar to turn with the spindle, and the lubricant can be placed between the collar 58 and bearing-sleeve 56, and any waste or dripping of the lubricant will be caught by the channel 62, and thus prevent it from reaching the malt. The upper ends of the spindles pass through collar 62, mounted upon the frame 54, Fig. 4, and are secured thereto by means of a nut 63, engaging the upper end of the spindle. The said collar 62 is provided with a flange 64 at its upper end, which rests on an annular bearing 65, secured to the frame 54. Thus it will be seen that the spindles while supported from the frame 54 can rotate therein in an obvious manner.

Figure 6:
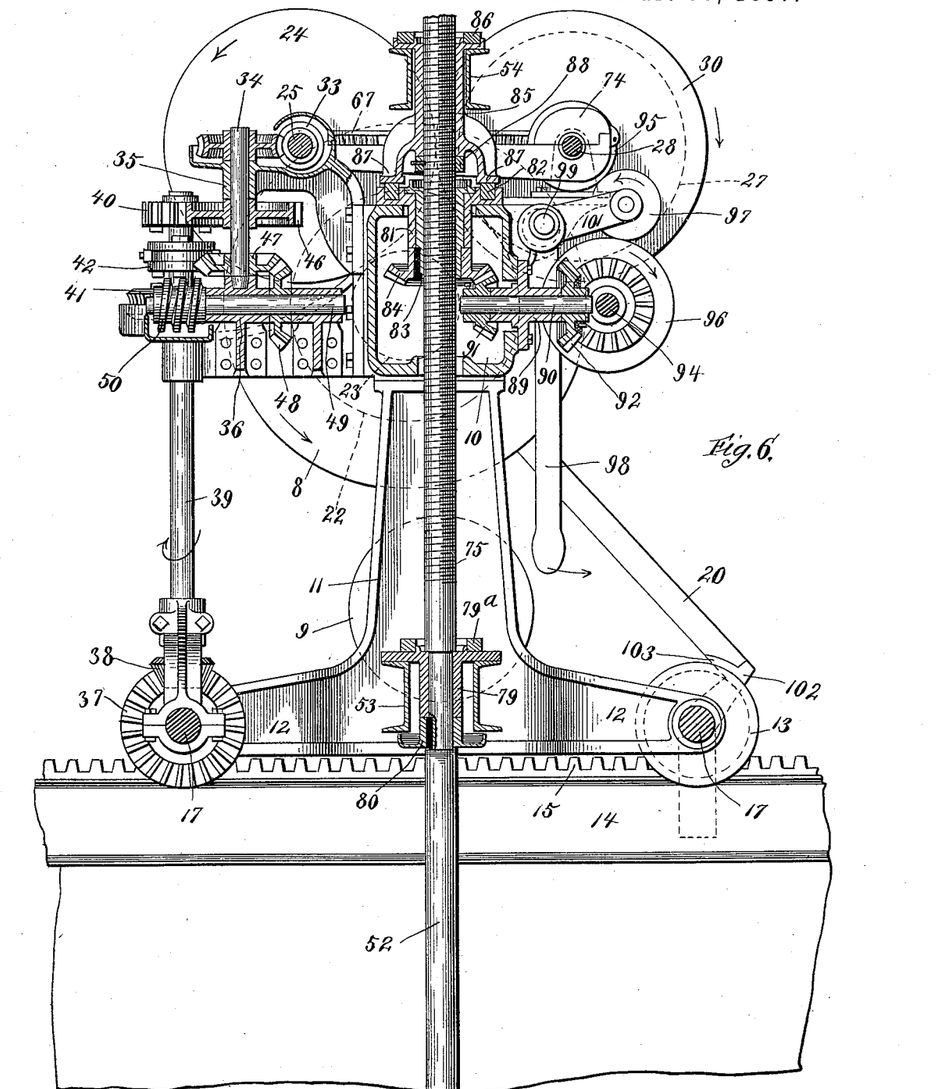
Fig. 6 is a vertical section taken on the line 6 6 of Fig. 5.
Figures 7, 8, 10:
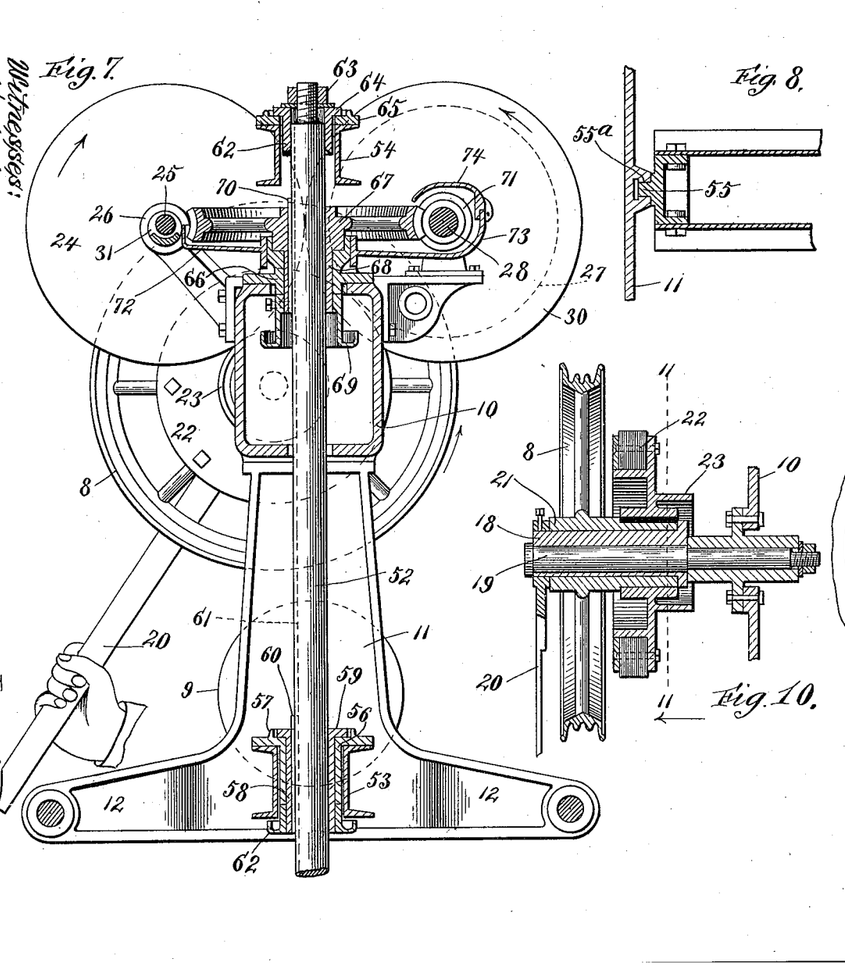
Fig. 7 is a vertical section taken on the line 7 7 of Fig. 5.
Fig. 8 is a fragmentary horizontal section showing the guides between the spindle brace-bar and the frame of the machine.
Fig. 10 is a horizontal section on the line 10 10 of Fig. 4.
Figures 9, 11:
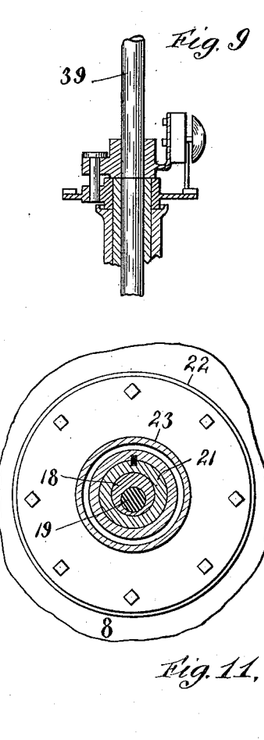
Fig. 9 is a detail section of the alarm device shown in Fig. 4.
Fig. 11 is a vertical section on the line 11 11 of Fig. 10.

The devices for rotating the spindles from the shaft 28, above referred to and specifically shown in Figs. 5, 6, and 7, are constructed as follows:

Referring now to Fig. 7, it will be seen that mounted upon the box 10 is a bearing-sleeve 66, and resting upon and situated within said bearing-sleeve 66 is the worm-wheel 67, whose hub 68 passes through said bearing-sleeve and carries at its lower end an annular lubricant-channel 69, whose upper end abuts against the lower end of the bearing-sleeve 66. The spindle 52 passes through the hub of the worm-wheel 67, and a key 70, carried by the said worm-wheel, enters the groove 61 in the spindle. Thus it will be seen that while the rotation of the worm-wheel will cause the rotation of the spindle, yet the latter can move longitudinally through the hub of the worm-wheel, while the spindle is kept free from the lubricant by the construction described. For rotating the spindle the shaft 28 is provided with a plurality of worms 71, intermeshing with the worm-wheels 67, as shown in Figs. 5 and 7, and a pan or dish-shaped frame 72 is mounted upon the sleeve 66 and extends beneath the worm-wheel 67 and worm 71 to prevent the dripping of the lubricant. This pan 72 has an extension 73, and the whole pan inclines toward this extension, so that the lubricant will congregate therein, while the upper side of this extension is provided with a removable overhanging hood 74, (shown in Figs. 6 and 7,) which, while it prevents the escape of the lubricant from the top of the worm 71, can be removed to permit the pan 72 and extension 73 to be cleaned. I have shown in the drawings the adjacent turning-screws set right and left, and therefore the corresponding worm-wheels and worms are correspondingly constructed to rotate these turning-screws in opposite directions, this being the most approved and successful arrangement in a machine of this kind.

As before stated, the malt-turning screws 51 and the frame, consisting of the frame-pieces 53 and 54, are raised and lowered during the transference of the machine, and the mechanism for raising and lowering said parts will now be described. To accomplish the raising or lowering of these parts, I employ two screw-shafts 75, Figs. 4 and 6, that are revolubly connected at their lower ends with the supporting-frame 53. Said screw-shafts pass through the box 10, having a certain screw-threaded connection therewith, and pass thence through the frame 54, having a certain screw-threaded connection therewith, and at their upper ends are revolubly connected with a cross-frame 76. Both of these screw-shafts 75 are rotated by the mechanism hereinafter described, but to insure their simultaneous rotations their upper ends are geared together conveniently, as shown in Fig. 4, by a sprocket-chain 77, trained around sprocket-wheel 78, rigidly secured to the upper ends of said screw-shafts. The said screw-shafts, as before stated, rotate with relation to the supporting-frame 53 and top frame 76, while they are incapable of longitudinal movement with relation to said parts. The connection between the lower end of the spindle 75 and frame 53 is also arranged to prevent the dripping of the lubricant, and consists of a box 79, mounted upon the frame 53 and within which the lower end of the screw-shaft turns, while secured to the lower end of the screw-shaft and abutting against the lower end of said box is a channel-piece 80 to catch the lubricant, as will be clearly understood, and which also serves as the connection between the screw-shaft and the frame, acting in this latter case as a nut, as shown in Fig. 6. Mounted upon the box 10 at such point where each of the spindles passes therethrough is a bearing-sleeve 81, which rests upon the upper face of the box and is provided with upwardly-projecting cushions 82, hereinafter referred to. Situated within this bearing-sleeve 81, Fig. 6, is a nut 83, engaging the screw-shaft 75 and held from longitudinal movement therein by flanges engaging the ends of the bearing-sleeve, the lower flange consisting of the hub of a bevel gear-wheel 84, that is rigidly secured to said nut 83. Mounted upon the frame 54 is a nut 85, that passes through said frame and is rigidly secured thereto. The upper end of said nut 85 is provided with a cushion or stop 86, while the lower end of the nut is provided with feet 87, adapted to come into contact with the cushion 82 on the bearing-sleeve 81 of the box. Secured to the screw-shaft between the nuts 85 and 83 is a collar 88, adapted to come into contact with the lower end of nut 85. By reason of the rotation of the nut 83 in opposite directions the said screw-shafts are adapted to be raised and lowered, as will be specifically pointed out in describing the operation of the machine hereinafter, and I will now proceed to describe the mechanism for operating said nut 83.

Mounted upon the box and extending through openings in the side thereof is a bearing 89, Fig. 6, in which is mounted a shaft 90. The inner end of this shaft, which is situated within the box, carries a bevel gear-wheel 91, intermeshing with the bevel gear-wheel 84 of nut 83. The outer end of this shaft 90 carries a bevel gear-wheel 92, which intermeshes with a bevel gear-wheel 93 on a shaft 94, running parallel with shaft 28, that turns the spindles. Adjacent to one end of the machine the shaft 28 is provided with a friction-wheel 95, Fig. 5, while opposite the latter and mounted upon the shaft 94 is a friction-wheel 96. Motion is communicated from the friction-wheel 95 to friction-wheel 96 by a friction-roller 97, that is operated by a lever 98. (Shown best in Figs. 5, 6, and 14.) The said lever 98 is fixed to a rock-shaft 99, hung in suitable bearings on the box of the machine and carrying an eccentric 100. Mounted upon this eccentric are two straps 101, which carry at their outer ends the friction-roller 97. It will therefore be seen that by swinging the lever 98 this friction-roller will be jammed between the friction-gears 95 and 96 to cause the latter to rotate from the former or be disengaged therefrom in an obvious manner. As before described, the shaft 28 is rotated from the main driving shaft or hub 21 through the intermediacy of the gearing above described, and the operation of these parts will be specifically described hereinafter.

Figures 2, 12, 13:
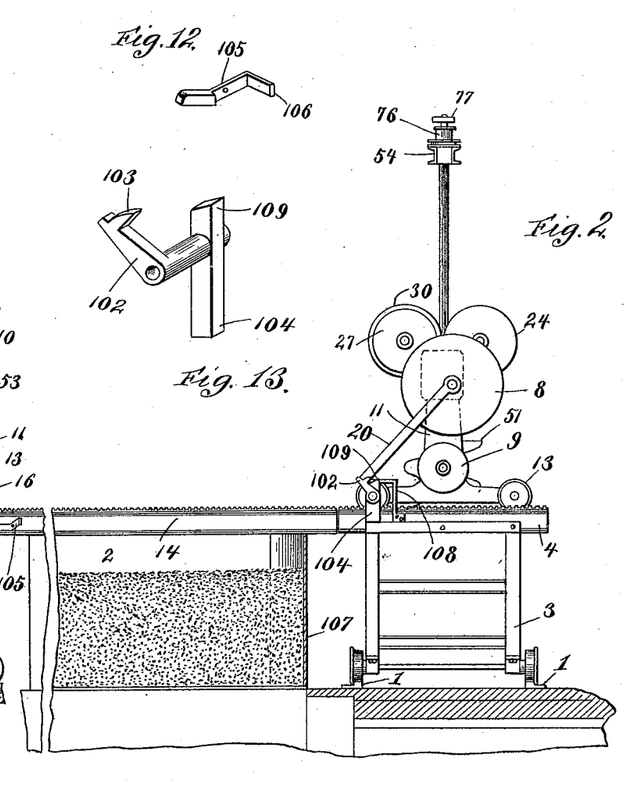
Fig. 2 is a side elevation of one of the compartments and accompanying parts.
Figs. 12 and 13 are detail views of the trip mechanism for controlling the movement of the machine.

To hold the lever 20 in the position shown in Figs. 2 and 6—that is to say, in a position to swing the friction-gear 22 in contact with the friction-gear 27—I employ a latch 102, that is pivoted on the shaft 17 at the rear side of the carriage, and this latch 102 has at its upper end a finger 103 to engage the lower notched end of said lever 20, Fig. 6. The latch is provided with a downwardly-projecting extension 104, and at the rear end of the compartment and secured to the rail 14 is a stop 105, pivoted to said rail and having an upper projection 106 so located to engage the extension 104 of latch 102.

Referring now to Fig. 2, it will be seen that as the machine advances toward the rear end of the compartment the stop 105 will engage the extension 104 of the latch and turn the latter to release the lever 20, whereupon said lever will fall to a vertical position and throw the friction-gear 22 out of engagement with gear 27, but will not throw the gear 23 in engagement with the gear 24. The said stop 105 is pivoted so that it can be swung to a position to permit the passage of the lever 20 in the opposite direction.

The machine being constructed and arranged as above described, the operation is as set out in the following description.

Figure 3:
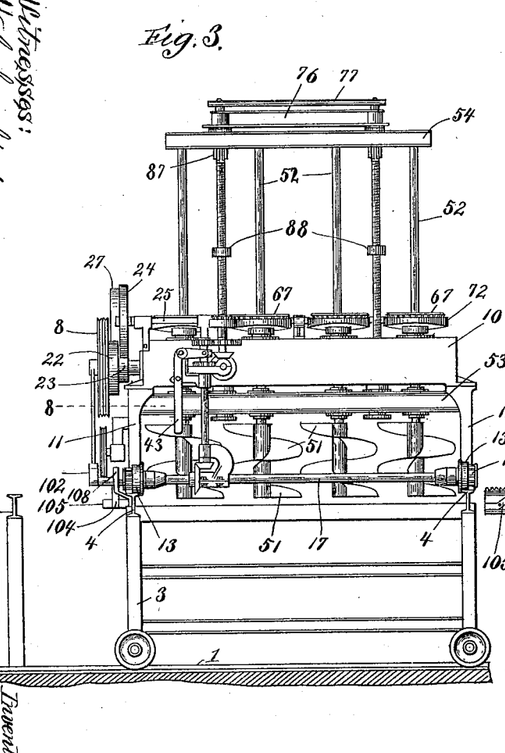
Fig. 3 is an end elevation of the same.

We will suppose that the machine is resting on the truck and in the position shown in Fig. 2—that is to say, with the screws elevated to the upper limit of their movement as they have been transferred from one compartment to another. It is therefore necessary to bring the machine over the compartment to be turned. To accomplish this, the cable 5 is trained around the sheave 8 and the lever 20 thrown to the position shown in Fig. 7, while at the same time the lever 43 is thrown inwardly to move the clutch 42 into contact with the spur-gear 40. When the parts are in this position, the rotating friction-gear 23 comes in contact with the friction-gear 24, and through the intermediacy of shaft 25, worm 33, shaft 24, spurs 46 and 40 the shaft 39 is turned to move the carriage from the truck onto the rails 14 at a fast speed. When the carriage is in the position—that is to say, when the malt-turning screws 51 are just within the niche-plates 107—the lever 43 is thrown to a vertical position or in the position shown in Figs. 3 and 4. The parts are then in the position shown in Fig. 3—that is to say, standing on the rails of the compartment with the malt-turning screws in a position to descend into the malt. The lever 20 is then swung to the opposite limit of its movement or in the position shown in Figs. 2 or 6 and engaged with the latch 102. This throws the friction-gear 22 in engagement with friction-gear 27, and then to bring the malt-turning screws downwardly and into the malt it is necessary to throw the lever 98 in the direction shown by the arrow in Fig. 6, the parts, however, being in the position shown in Fig. 3, while Fig. 6 shows the position of the parts after the screws have descended into the malt. By throwing lever 98, as pointed out, the friction-roller 97 is jammed between friction-gears 95 and 96, and, the former rotating through the intermediacy of gears 22 and 27 and shaft 28, the latter will be rotated also. This rotation of the shaft 28 will give the spindles 52 the rotation to screw the malt-turning screws 51 into the malt, while the rotation of the gear 96 is such that the bevel-gear 84 upon the nut 83 is turned so that said nut turns the screw-shaft 75 in a direction to cause it to descend, but when the frames 53 and 54 are elevated or in the position shown in Fig. 3 the rotation of the nut 83, Fig. 6, will cause the rotation of screw-shaft 75—that is to say, the latter will turn with the former, because the friction between the screw-shaft 75 and nuts 83 and 85, Fig. 6, is in proportion to the weight coming upon said nuts, the nut sustaining the least weight, of course, turning upon the screw-shaft. Therefore since the weight upon the nuts 85 consists of the frame 54 and spindles 61 with their screws, while the weight upon nuts 83 consists of the same parts and the frame 53, the nuts 83 will turn the screw-shafts 75 with them, while said screw-shafts 75 turn within the nuts 85. This movement obviously causes the frame 54 and depending spindles 52 to descend, and this operation continues until the nuts 85 come in contact with the collars 88 upon the screw-shaft, which prevents the relative rotation of said screw-shafts 75 and nuts 85. Therefore the nuts 83 will begin to turn around the screw-shafts, and thus lower the screw-shafts 75, and with them the frame 53, the frame 54 and depending spindles and malt-turning screws descending with them. The malt-turning screws screw themselves into the malt as they descend, and when in the position shown in Figs. 4 and 6 the lever 98 is thrown to the vertical position shown in Fig. 6, which stops the rotation of nuts 83, the malt-turning screws, however, continuing to rotate, as will be obvious. The operator then swings the lever 43 outwardly to cause the clutch 42 to engage the worm-wheel 41 and locks the same in this position by the set-screw 44, Fig. 5. This causes the rotation of the gear-wheels 16 to move the machine toward the rear end of the compartment, the movement being, however, slow, since the rotation of the shaft 39 is caused by the worm 50 through worm-wheel 41. The machine then moves until it reaches the rear end of the compartment, or until the extension 104 of latch 102 strikes the stop 105. This trips the latch and permits the lever 20 to fall into a vertical position, thereby throwing the gears 22 and 23 out of engagement, so that the sheave 8 turns freely. The next operation consists in lifting the screws out of the malt, and to accomplish this the operator first throws the lever 43 into the position shown in Fig. 4 and secures it in that position by means of the thumb-screw 44. This prevents the rotation of the shaft 39 and obviously prevents the carriage from moving. The friction-wheel 97 is then thrown into engagement with the friction-wheels 95 and 96, thus transmitting the motion of the shaft 28 to the shaft 90 through the intermediacy of the bevel-gears 92 on said shafts 90, and the bevel-gears on the shaft 94, with which it intermeshes. The lever 20 is then thrown into the position shown in Fig. 7, thus throwing the friction-wheel 22 into engagement with the friction-wheel 27, thus causing the rotation of the shaft 28, and consequently the shafts 90. The shaft 28 obviously moves reversely to the direction which causes the screws to descend. The movement of the lever 20 also obviously causes the screws 51 to reverse. The motion of the shafts 90 is transmitted to the nuts 83 through the intermediacy of the bevel-gears 91 and 84, respectively. This will cause the rotation of the screw-shafts 75, for the reason that the friction will adjust itself automatically to raise the least weight first, and this rotation of the screw-shafts 75 within the nuts 85 will cause the supporting-frames 53 and 54, in the latter of which said nuts 85 are mounted, to rise. The malt-turning screws are turning reversely during this time, and they thus, so to say, screw themselves out of the malt. The said supporting-frames 53 and 54 and the depending spindles will rise until the cushions 86 on said nuts 85 come in contact with the supporting-frame 76. This will prevent the further rotation of said screw-shafts, and as said nuts 83 continue to turn they will now turn about said screw-shafts and cause the latter to rise and carry said supporting-frames 53 and 54 and the depending spindles with them until the cushions 79ª of the frame 53 strike the lower face of the box 10. As soon as these parts come in contact the operator allows the levers 20 and 98 to swing to a vertical position, thus throwing the friction-wheels 22 and 23 out of engagement with either of the friction-wheels 27 and 22, respectively, and the friction-wheel 97 out of engagement with the friction-wheel 95, thus allowing the free rotation of the sheave 8 without operating any of the moving parts of the machine. The machine is now ready to be run back to the forward end of the compartment, and to accomplish this, it being understood that the lever 20 stands in a vertical position, the stop 105 is swung on its pivot to take the extension 106 out of the path of extension 104 of the latch, and then the lever 20 is again thrown in contact with the latch and locked in the position shown in Figs. 2 and 6. This of course causes the rotation of the shaft 25, and then by throwing the clutch 42 in engagement with spur 40 of the driving mechanism the machine moves toward the front end of the compartment at the high rate of speed and will run from the compartment onto the truck until the stop 108 upon the truck strikes the upwardly-projecting lug 109 of latch 102, swings said latch and permits the lever 20 to drop, whereupon the machine will be at rest. The cable 5 is then taken off of the sheave 8 and the truck moved upon track 1 to the next compartment to be turned.

It will be understood, of course, that the tripping of the latch 102 is not essential, but that the same may be operated by hand at either end of the compartment; but the stops 105 and 108 serve to automatically arrest the movement of the machine should the operator not be in attendance.

I claim as my invention—

1. In a malt-turning machine, a carriage provided with suitable running-gear, gearing between said running-gear and a source of power mounted upon the said carriage for moving said carriage back and forth and for imparting a variable speed thereto, a plurality of malt-turning screws mounted upon said carriage, and gearing between said malt-turning screws for raising and lowering the same and for turning the same in opposite directions as they are being raised and lowered.

2. In a malt-turning machine, a carriage provided with a suitable running-gear, a source of power or driven part carried by said carriage, gears 22 and 23 carried by said source of power or driven part, intermeshing gears 24 and 30 carried by said carriage, one of which intermeshes with one of said gears 22 and 23, a gear 27 rigid with the other of said gears 24 and 30 and adapted to intermesh with the other of said gears 22 and 23, devices for throwing the gears 22 and 23 alternately in contact with gears 27 and 24 or out of contact with the same, and gearing between said gear 24 and the running-gear of the carriage.

3. In a malt-turning machine, the combination with intermeshing gears 24 and 30, said gear 30 carrying a gear rigid therewith, of a source of power or driven part carrying rigid therewith gears 22 and 23 which are adapted to intermesh with gears 27 and 24, and devices for moving said gears 22 and 23 into or out of contact with said gears 27 and 24.

4. In a malt-turning machine, the combination with the frame of the carriage, of a shaft 19 secured thereto, a sleeve 18 mounted eccentrically thereon, a sheave or pulley revoluble upon said sleeve 18 and carrying gears 22 and 23 rigid therewith, an arm or lever 20 rigid with said sleeve 18 for turning the same, and intermeshing gears 24 and 30, said gear 30 carrying a gear 27, and said gears 27 and 24 being adapted to intermesh with said gears 22 and 23.

5. In a malt-turning machine, the combination with the gears 22 and 23 for operating said machine, said gears being movable and adapted to come in contact with other gears carried by the carriage, of an arm or lever 20 connected with said gears 22 and 23 for moving the same, a latch 102 mounted upon said carriage and adapted to engage and hold said arm or lever 20, and a stop 105 mounted upon the malt-turning compartment to engage said latch 102.

6. The combination with the movable arm or lever 20, of a malt-turning machine, and the latch 102 mounted upon the said machine adapted to engage said arm or lever 20, of a stop 105 mounted upon the walls of a malting-compartment and adapted to engage said lever, said stop being pivoted.

7. The combination with a malting-compartment and a movable truck adapted to be moved opposite the end thereof, said truck being provided with a stop 108, of a malt-turning machine provided with a movable arm or lever 20 adapted to be engaged by a latch 102 upon the carriage of said malt-turning machine, said stop 108 being situated in the path of said latch 102.

8. In a malt-turning machine, the combination with a shaft 39 for driving the running-gear of the carriage of said malt-turning machine, said shaft being provided with loose gears 40 and 41 each of which is provided with clutch-faces, a clutch 42 mounted upon said shaft, devices for moving and securing said clutch 42 in contact with either of said clutch-faces or out of contact with the same, and gears 46 and 50 intermeshing with said gears 40 and 41, and gearing between said gears 46 and 50, and a suitable source of power.

9. In a malt-turning machine, the combination with the carriage, its running-gear, and devices for moving said carriage back and forth, of a plurality of malt-turning screws carried by spindles mounted upon said carriage, and devices for raising and lowering said spindles and for turning them in opposite directions as they are raised or lowered.

10. In a malt-turning machine, the combination with the carriage having a plurality of upright and longitudinally-movable spindles carrying malt-turning screws, and devices for rotating the same, of a frame 54 connected with the upper ends of said spindles, screw-shafts 75 connected together at their upper ends by a frame 76 and at their lower ends by a frame 53 and having a screw-threaded connection with said screw-shaft 75, and nuts 83 mounted upon the frame of said carriage and through which said screw-shafts pass, and gearing between said nuts 83 and the source of power for turning said nuts in opposite directions.

11. In a malt-turning machine, the combination with the carriage provided with a plurality of upright and longitudinally-movable spindles carrying malt-turning screws, and devices for rotating said spindles, of a frame 54 connected with the upper ends of said spindles, screw-shafts 75 connected at their upper and lower ends with frames 76 and 53, nuts 85 carried by said frame and through which said screw-shafts pass, stops 86 carried by said nuts 85 adapted to come in contact with said frame 76, collars 88 rigid with said screw-shafts and situated below said nuts 85, nuts 83 carried by the frame of the carriage and through which said screw-shafts pass, cushions or stops between said frame of the carriage and said nuts 85, and gearing between said nuts 85 and the source of power or driven part for turning said nuts in opposite directions.

12. In a malt-turning machine, a carriage provided with running-gear, gearing between said running-gear and a shaft 39 carrying differential gears loosely mounted thereon, a shaft 34 carrying a worm-wheel driven from the drive-shaft of said machine geared to one of said differential gears, a shaft 49 adjacent the other of said differential gears and carrying a worm adapted to engage said last-named differential gear, gearing between said shaft 49 and said shaft 34, and a clutch member rigidly mounted upon said shaft 39 adapted to engage either of said differential gears.

13. In a malt-turning machine, a plurality of vertically-movable spindles, mounted in bearings in vertically-movable beams, means for imparting vertical movement to the uppermost of said beams and to said spindles, and connection between said spindles and said lowermost beam to impart vertical movement thereto during part of the movement of said spindles.

In testimony whereof I affix my signature in presence of two witnesses.

WILLIAM H. PRINZ.

Witnesses:
HARRY COBB KENNEDY,
E. J. BOILEAU.